Patented Mar. 27, 1951

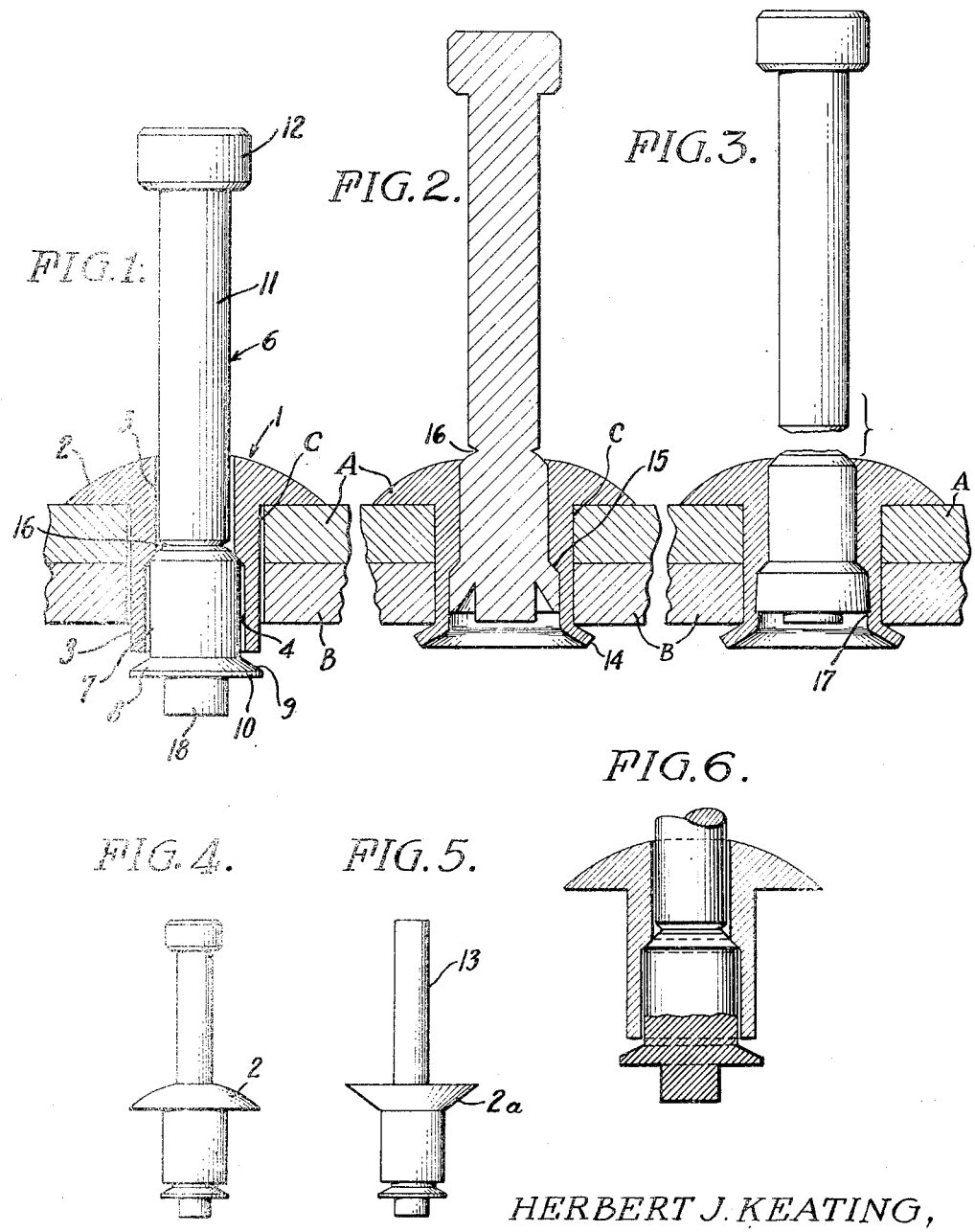

2,546,602

UNITED STATES PATENT OFFICE 2,546,602

RIVET WITH SELF-LOCKING MANDREL

Herbert J. Keating, Pasadena, Calif., assignor to Cherry Rivet Company, Los Angeles, Calif., a corporation of California Application May 14, 1945, Serial No. 593,666

2 Claims. (Cl. 85—40)

My invention relates to rivets and has particular reference to rivets of the blind rivet type employing a rivet body and a mandrel associated with the body for the purpose of expanding the rivet body into riveted position in work sheets or workpieces.

Blind rivets of the type employing a hollow rivet body having a mandrel extending therethrough adapted to be engaged by a setting tool on the same side of the workpiece as the rivet body head is disposed so as to permit the setting of the rivet without access to the inner end of the rivet, have come into common use. It is frequently the practice to employ a mandrel which, after it has performed the rivet setting operation, will be broken off so that the mandrel remains as a permanent part of the finished riveted blind rivet, the mandrel closing the bore through the hollow rivet body.

In order to insure that the mandrel will remain in its permanent position within the rivet body after the rivet has been set, it is necessary that the dimensions of the mandrel relative to the dimensions of the rivet body bore must be carefully controlled within extremely narrow limits and likewise it is necessary to maintain the external diameter of the shank of the rivet body within relatively small limits with respect to the hole in the workpiece into which the rivet is to be set as otherwise the rivet mandrel may be shaken loose and fall from its desired position, that is, plugging the hole through the rivet.

Various expedients have been suggested for attempting to lock the mandrel in its set position such as the employment of a burring operation to produce a burr on the outer end of the mandrel stem, in effect riveting the outer end of the stem over at the rivet body head, or by providing threads or other projections upon the mandrel to cut into the material of the rivet body during the rivet setting operation to increase the frictional forces exerted between the mandrel and the rivet body.

It is therefore an object of my invention to provide a blind rivet assembly in which the mandrel, when drawn into the rivet body for the purpose of upsetting the rivet, will not only upset the projecting inner end of the rivet body shank to hold the rivet in place but will so engage the internal surfaces of the rivet body bore as to permanently lock itself in place after the upsetting operation is complete.

Another object of my invention is to provide a rivet assembly of the character set forth in the preceding paragraph wherein the mandrel is provided with an upsetting head for expanding the projecting inner end of the rivet body shank, the head being formed with a substantially knife-like peripheral edge adapted to contract during the setting operation but adapted to expand into a gripping relation with the interior of the body bore when the drawing strain is released as the mandrel stem is broken.

Another object of my invention is to provide a rivet assembly of the character set forth in the preceding paragraph wherein the rivet body bore is formed on two diameters, the smaller being adjacent the rivet body head, the junction of the smaller and larger bores comprising a shoulder against which the upsetting head of the mandrel abuts to limit the drawing movement of the mandrel through the rivet body bore to a predetermined position before the stem of the mandrel will break.

Other objects and advantages of my invention will be apparent from a study of the following specifications, read in connection with the accompanying drawings, wherein Fig. 1 is a vertical sectional view of a rivet assembly constructed in accordance with my invention in place in aligned holes in a pair of work sheets and illustrating the position of the parts prior to the rivet setting operation;

Fig. 2 is a view similar to Fig. 1, illustrating the position of the parts at the end of the rivet setting operations but prior to the breaking of the stem of the mandrel;

Fig. 3 illustrates the position of the parts immediately after the breaking of the stem of the mandrel;

Fig. 4 is an elevational view of the rivet assembly illustrated in Fig. 1;

Fig. 5 is an elevational view of a modified form of rivet assembly embodying the principles of my invention; and Fig. 6 is a detail vertical sectional view taken through the rivet shown in Figs. 1 through 4.

Referring to the drawings, I have illustrated in Fig. 1 a pair of work sheets A and B which are to be riveted together by means of a rivet assembly embodying my invention. The work sheets A and B have aligned holes C extending therethrough and into which may be inserted the rivet assembly comprising a rivet body 1 having a head 2, from which extends a shank 3 formed with coaxial bores 4 and 5, the diameter of the bore 4 which is adjacent to the inner end of the rivet body being somewhat larger than the diameter of the bore 5 which is disposed adjacent the head end or outer end of the rivet body. A mandrel, indicated generally at 6, comprises a cylindrical member including a portion 7 for laterally expanding the shank of the rivet to insure that it fills the holes C in the sheets A and B as the mandrel is drawn inwardly of the rivet body.

Disposed immediately inwardly of the laterally expanding portion 7 is an upsetting ring 8 constructed in the form of a radially extending flange formed on the mandrel 6, the flange 8 having that part of its surface disposed immediately adjacent the portion 7 tapered as indicated at 9 so that the peripheral edge 10 of the expanding ring 8 will be relatively thin and present a substantially knife edge to the interior walls of the bore 4 as will be more fully hereinafter set forth.

The mandrel 6 is provided with a stem portion 11 having an external diameter permitting it to pass with substantial freedom through the smaller diameter bore 5 of the rivet body, the stem 11 extending sufficiently beyond the rivet body head 2 to permit its ready grasping by conventional blind rivet setting tools. If desired, the extreme outer end of the stem 11 may be formed with a tool-engaging head 12 or the stem may be of uniform diameter throughout its length, as indicated at 13 in Fig. 5.

By referring to Fig. 2, it will be observed that when the rivet setting tool has been applied to the rivet assembly and the mandrel is drawn inwardly of the rivet body, the portion 7 of the mandrel will expand the upper portion of the rivet body shank 3 radially into tight engagement within the hole C or the upper or outer sheet A. The expanding ring or skirt 8 will first engage the extreme projecting outer end 14 of the shank, expanding it radially to the position shown in Fig. 2 during the initial inward movement of the mandrel 6.

However, as continued pull is exerted upon the mandrel, the skirt 8 will yield and enter the bore 4, expanding the lower or inner portions of the shank into engagement with the hole C in the lower plate B while such operation will cause the skirt to be bent inwardly and downwardly until the upper surface 9 engages the shoulder 15 at the junction of the larger and smaller diameter bores 4 and 5. This time the resistance to the pulling of the mandrel through the rivet body bore will be sufficiently increased that the stem 11 will be broken off, as indicated in Fig. 3, the precise point of breakage being preferably predetermined by a scoring of the stem 6, as indicated at 16 in Fig. 1, preferably at the junction of the stem 6 with the expanding portion 7 of the mandrel so that the break occurs with the protruding portion of the mandrel substantially flush with the outer surface of the rivet body head 1.

However, when the mandrel snaps, the sudden release of tension will cause the mandrel to attempt to move downwardly in the rivet body bore a slight distance but since the skirt portion 8 immediately prior to this time has been under considerable radial tension, there will be a tendency for the edge 19 of the skirt to expand radially, the edge 10 tending to bite into the surrounding material of the rivet body shank, as indicated at 17 in Fig. 3. Thus the retractive movement of the mandrel will be arrested and the mandrel, by reason of the cutting into the shank of the edge of the skirt, will be self-locking against inadvertent removal from its rivet body plugging position.

In the rivet assemblies wherein the material of the rivet body is of such strength that the mandrel skirt might tend to permanently collapse as it is drawn into the rivet body, an extension 18 of the mandrel may be formed on the trailing end of the mandrel below the skirt for the purpose of providing a substantial abutment against which the skirt may fall as it is drawn into the position shown in Fig. 2, thus reinforcing the strength of the material of the skirt sufficiently to permit it to perform its radial expanding operations on the rivet body shank and yet the resilience of the material of the skirt will be sufficient to cause it to radially expand to the position shown in Fig. 3.

In Fig. 5 there is illustrated a modification of the particular rivet shown in Figs. 1, 2, 3 and 4 to illustrate the manner in which the same principles of my invention as set forth hereinbefore may be applied to a rivet having a countersunk type of head 2a instead of the round head 2.

While I have shown and described the preferred embodiment of my invention, I do not desire to be limited to any of the details of construction shown and described herein, except as defined in the appended claims.

I claim:

1. A blind rivet assembly for use in aligned holes in a pair of work pieces, the outermost workpiece being of a predetermined thickness, comprising a rivet body having a head and a shank, the shank adapted to be inserted through the aligned workpiece holes, a bore extending longitudinally through the rivet body, said bore having that portion of its length adjacent the head formed with a smaller diameter than the remaining portions of said bore, said smaller diameter portion having a length along the shank substantially equal to the thickness of the outer workpiece with which it is to be used, a mandrel in said bore having a portion of its length disposed toward the head of the body formed upon a diameter smaller than the smaller bore diameter of the rivet body, and a second portion of the mandrel having a greater diameter than the first mentioned portion of the bore and smaller than the remaining portions of the bore, the mandrel having an upsetting head larger than the greatest diameter of the bore disposed further away from the body head for engaging and upsetting the end of the shank, the upsetting head comprising a deformable skirt and being so shaped that it first upsets the end of the shank of the rivet body and then expands the greater diameter portion of the bore against the wall of the opening of one of the workpieces and being of less length than the other workpiece so that it lies entirely within that portion of the bore adjacent the other workpiece.

2. The structure as defined in and by claim 1, wherein the mandrel has a reduced portion beyond the deformable skirt providing an abutment to limit the deformation of the skirt.

HERBERT J. KEATING.

REFERENCES CITED

The following references are of record in the file of this patent:

UNITED STATES PATENTS

| Number | Name | Date |
|---|---|---|
| 877,865 | Ricksecker | Jan. 28, 1908 |
| 1,423,966 | Palmaffy | July 25, 1922 |
| 1,847,385 | Dengler | Mar. 1, 1932 |
| 2,061,629 | Huck | Nov. 24, 1936 |
| 2,114,493 | Huck | Apr. 19, 1938 |
| 2,371,423 | Buchet | Mar. 13, 1945 |
| 2,372,222 | Mullgardt | Mar. 27, 1945 |
| 2,384,321 | Lees | Sept. 4, 1945 |
| 2,501,567 | Huck | Mar. 21, 1950 |

FOREIGN PATENTS

| Number | Country | Date |
|---|---|---|
| 472,329 | Great Britain | Sept. 22, 1937 |
| 724,509 | France | Jan. 29, 1932 |
| 743,881 | France | Apr. 7, 1933 |